April 9, 1940.  S. N. BUCHANAN  2,196,383
WIRE CONNECTOR
Filed June 1, 1938   2 Sheets-Sheet 1
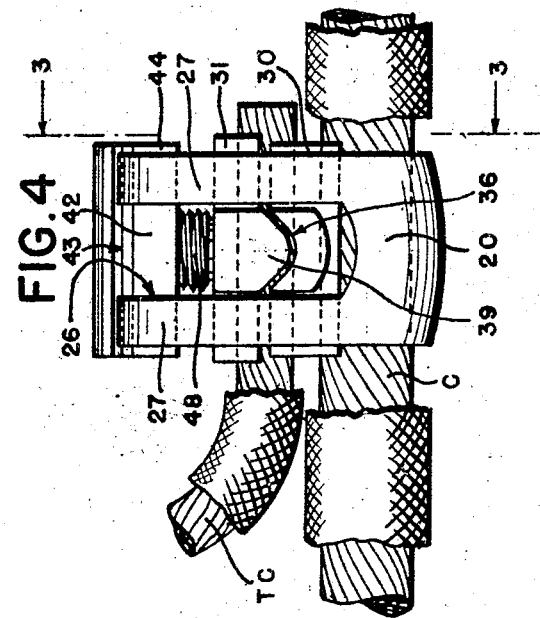
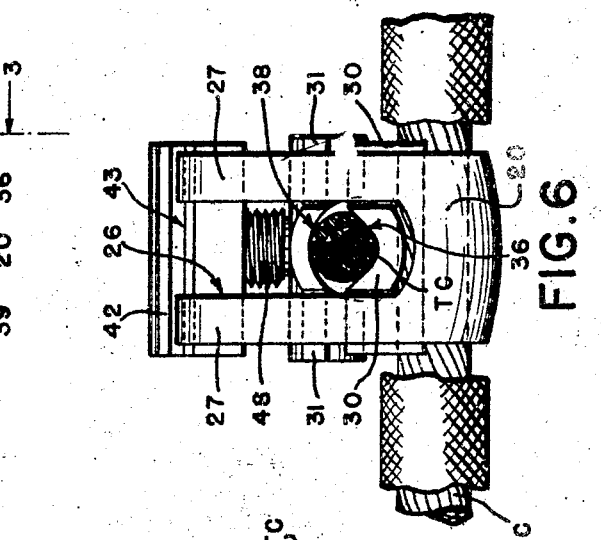
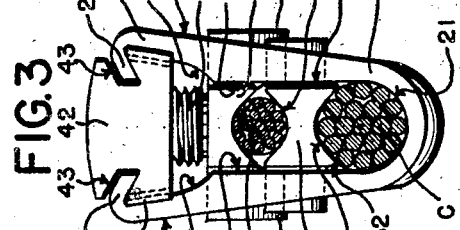
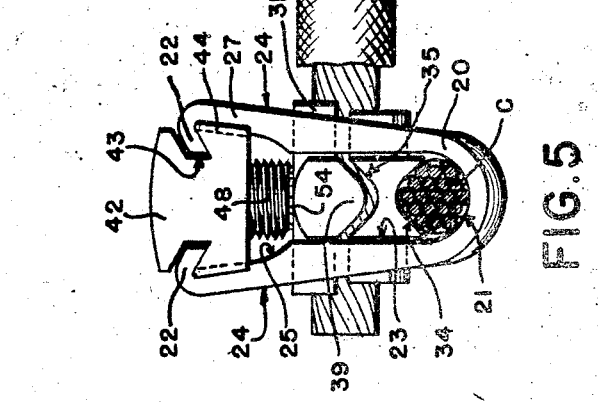
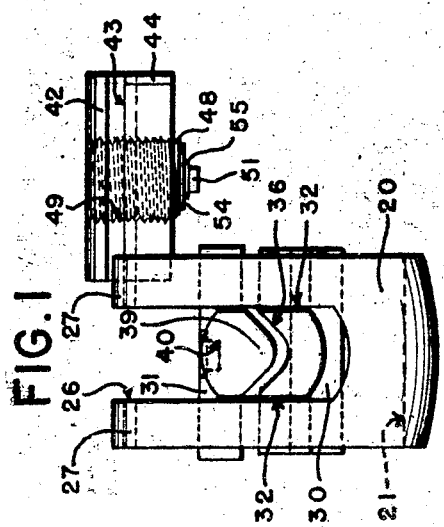
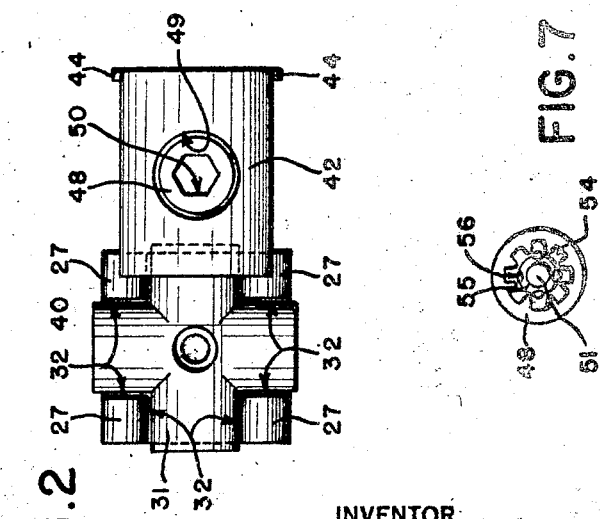
INVENTOR
STEPHEN N. BUCHANAN
BY
Bohleber & Ledbetter
ATTORNEYS April 9, 1940.   S. N. BUCHANAN   2,196,383
WIRE CONNECTOR
Filed June 1, 1938   2 Sheets-Sheet 2
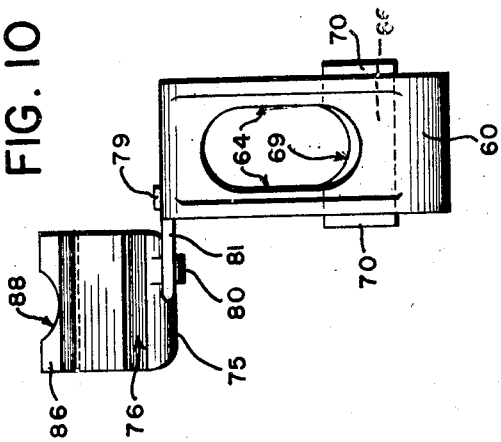
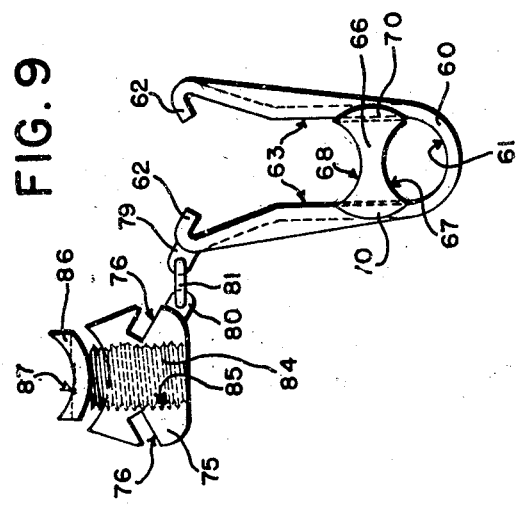
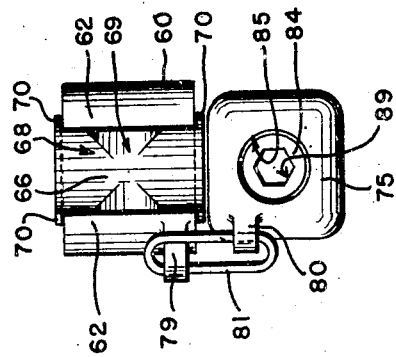
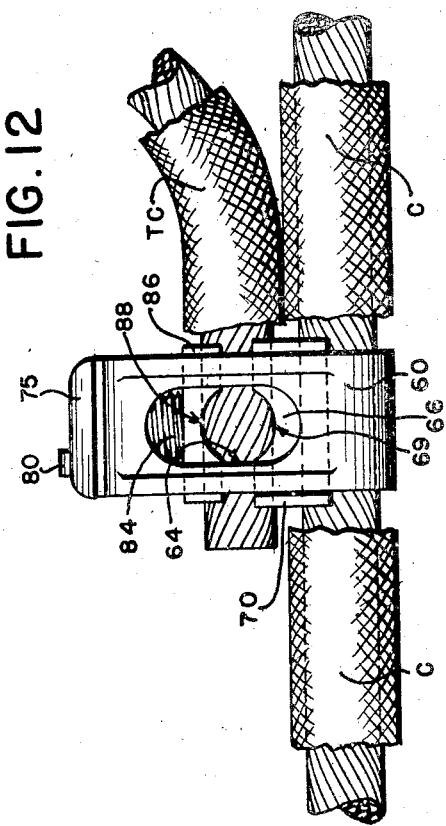
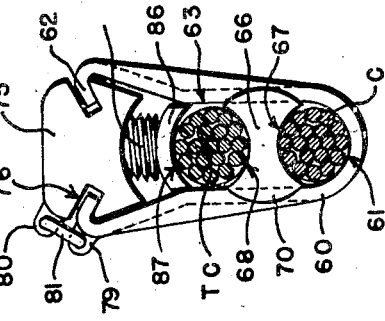
INVENTOR
STEPHEN N. BUCHANAN
BY Bohleber & Ledbetter
ATTORNEYS Patented Apr. 9, 1940

2,196,383

UNITED STATES PATENT OFFICE 2,196,383

WIRE CONNECTOR

Stephen N. Buchanan, Elizabeth, N. J., assignor to The Thomas & Betts Co., Elizabeth, N. J., a corporation of New Jersey

Application June 1, 1938, Serial No. 211,104

12 Claims. (Cl. 24—243)

The invention relates to a wire connector which secures and electrically connects together a main cable or wire and a tap-off cable or wire for an electrical branch connection with the main cable. The invention has particular reference to a wire connector having a wire or cable receiving member and another member which closes the open end thereof by sliding laterally into closing position.

It is an object of the invention to construct a new and novel form of wire connector which effectively grips two wires therein and utilizes a single operating means for clamping both wires or cables within the connector.

Another object of the invention is to construct a wire connector which is adapted to secure and electrically connect two wires or cables therein, the wire connector being of the tongue and groove type in which a wire or cable receiving member, preferably of U-shape, receives the wires or cables and a closing member slides laterally into position over the open end of the U-shaped member to close the same. The laterally slidable member is retained in position against inadvertent or accidental removal.

Another object of the invention is to provide a wire connector having a U-shaped member and a member closing the open end thereof, the two members being retained together by a construction which will enable the tap-off wire to be connected either parallel or at an angle to the main cable.

Another object is to construct a wire connector having two members, one of which slides laterally with respect to the other, and to lock these two members together against separation by utilizing the operating means or screw.

A still further object is to construct a wire or cable connector having a U-shaped member with slots in the side thereof, a member closing the open end of the U-shaped member, and a spacer carried by the wire connector to be positioned between two wires or cables within the connector, which spacer is removable from the connector only by removing the closing member from over the open end of the U-shaped member.

Other objects of the invention will be more apparent from the following description taken in connection with the accompanying drawings, illustrating two embodiments of the invention, in which:

Figures 1 through 7 show one form of the invention.

Figure 1 is a side elevation of the wire connector with a wire spacing member and an operating clamping member in position in the U-shaped member, and the closing member just beginning to be laterally slid into position over the open end of the U-shaped member.

Figure 2 is a top view of the wire connector looking down upon the open end of the U-shaped member and shows the wire spacing member retained therein and the closing member partially slid laterally over the open end of the U-shaped member.

Figure 3 is an end elevation of the wire connector with two wires or cables clamped therein in parallel relation.

Figure 4 is a side elevation of the assembled wire connector of Figure 3.

Figure 5 is an end elevation of the wire connector showing a lower main cable and an upper tap-off cable clamped therein at right angles to the main cable.

Figure 6 is a side elevation of the assembled wire connector of Figure 5.

Figure 7 is an end elevation of the operating means or screw showing the manner in which a lock washer is secured thereto.

Figures 8 through 12 illustrate a second form of the invention in which the laterally slidable or closing member is permanently joined to the wire receiving or U-shaped member.

Figure 8 is a top view of the wire connector with the closing member, which slides laterally over the open end of the U-shaped member, positioned adjacent the open end of the U-shaped member preparatory to being laterally moved into assembled position.

Figure 9 is an end elevation of the wire connector with the closing member retained upon the U-shaped member, but pivoted away from position adjacent the open end so that wires or cables may be inserted therein.

Figure 10 is a side elevation of the wire connector of Figure 9.

Figure 11 is an assembled end elevation of the wire connector with a main cable or wire and a tap-off cable or wire within the connector, the closing member in position closing the open end of the U-shaped member, and the operating means or screw clamping both cables within the connector.

Figure 12 is a side elevation of the assembled wire connector of Figure 11.

The wire connector has a wire receiving member with a passage therethrough to receive one or more wires or cables. The wire receiving member is preferably U-shaped, the bottom of which provides a wire seat 21, and the channel therethrough providing a wire receiving passage. At the open end of the U-shaped member, each side is provided with a tongue 22 extending inwardly. The inner surfaces or faces 23 of the U-shaped member are parallel so that they may form guides, as will appear more fully hereinafter. The outer surfaces or faces 24 of the U-shaped member taper outwardly. An undercurrent or recess 25 is provided at the open end of the U-shaped member so that the ends of the tongues 22 are substantially in alignment with the surfaces or guides 23 whereby a passage of uniform dimension is provided in the U-shaped member for the insertion of wires or cables therein.

Each side of the wire receiving or U-shaped member 20 preferably has an opening 26 which, in Figures 1 through 7, is a slot 26. This slot is illustrated as extending completely to the open end of the U-shaped member which in effect provides four extending arms 27 upon the U-shaped member. The openings or slots have a double function, first, to enable a tap-off wire to be mounted therein at an angle and particularly at right angles to the main cable, and, secondly, to provide means for retaining the clamping members within the connector, as will be discussed.

Two clamping members are preferably provided, namely, a spacing or central clamping member 30 which is adapted to be located between the two wires or cables, and an outer or upper clamping member 31. Both clamping members are in the form of a couped cross so that they are retained in position for longitudinal movement in the wire receiving member between the four arms 27, as illustrated in Figure 2. These clamping members are freely slidable between the surfaces 23 of the U-shaped member and within the slot 26. Obviously, one or both clamping members may be dispensed with, although they aid materially in the clamping action.

The central clamping member or wire spacer 30 has a wire seat 34 in one face thereof, a wire seat 35 upon the opposite face which is parallel to the wire seat 21, and a third wire seat 36, illustrated in Figure 1, which is in the plane of wire seat 35 and extends at right angles to the wire seats 34 and 35. This clamping member 30 adjusts itself or floats between the two cables, since its position depends upon relative distortion or mashing between the two cables. It is for this reason that the wire spacer is permitted to move longitudinally or float within the connector to form a floating clamping member. The wire seats are preferably formed by grooves which conform approximately to the circular cross-section of a cable so that the cables are not substantially mashed when clamped and retain their circular cross-section as much as possible.

The sides 32 of the wire spacer 30 are of such length and fit the sides of the slot and wire passage in the U-shaped member 20 closely enough so that the wire spacer is freely movable between the arms towards and away from the wire clamping seat 21 carried by the U-shaped member and so that the wire spacer cannot be substantially cocked therebetween. The wire spacer is, therefore, movably retained between the arms, yet cannot be removed from the wire connector so long as the closing member is over the open end of the arms or U-shaped member.

The operating or upper clamping member 31 has a wire seat 38. Upon each side of the wire seat 38 a V-shaped projection 39 may be provided, if desired, which fits into one of the grooves formed by the wire seat 35 or 36, as will appear more fully hereinafter. The projections 39, as illustrated in Figure 1, fit into the groove forming the wire seat 36 and close up the opening which otherwise would be formed by the opposed wire grooves.

The operating clamping member 31 may be removed from the wire connector and rotated through 90 degrees so that its wire seat 38 extends at an angle, which is illustrated in Figures 5 and 6 as being at right angles to the wire seats 21 and 34. This position of the operating clamping member permits a tap-off wire to be clamped within the wire connector at an angle, and particularly at right angles to the main cable which is clamped between the wire seats 21 and 34. In this position of the operating or upper clamping member, the projections 39 rest within the groove formed by the wire seat 35.

The upper clamping member has a recess or countersink 40 on the face thereof opposite from the clamping seat, the purpose of which will appear more fully hereinafter. The recess is a double countersink of different diameters, the purpose of which will be discussed hereinafter.

A closing member 42 has a groove 43 in each side thereof to slidably receive the tongues 22. The closing member is slid laterally into position over the open end of the U-shaped member 20 and thereby closes the open end thereof and also closes the open end of the slots 26. Preferably a shoulder 44 is provided upon the end of the closing member and upon each side thereof to provide a stop at one end of the closing member so that when the shoulders engage the arms 27, the closing member will be in proper position completely closing the open end of the U-shaped member. The wire receiving or U-shaped member and the closing member together form a frame for the wire connector.

The tongue and groove means 22 and 43 particularly illustrated, by which the closing means is retained in position over the open end of the U-shaped member 20, is merely illustrative. Any suitable interengaging means carried by the two members for retaining the closing member in position over the open end of the U-shaped member, and in which the interengaging means are brought into relation with each other by relative lateral movement between the two members, is contemplated.

Operating means is carried by the frame to clamp the cables within the wire connector and is preferably carried by the closing member 42. The operating means includes the operating clamping member 31, previously described, and an operating screw 48, that particularly illustrated being a headless screw. The operating screw is received in a threaded hole 49 extending through the closing member. The screw has a hexagonal recess 50 in the end thereof to receive a hexagonal wrench.

The end of the operating screw 48 has a nub 51 which is received in the recess 40 in the operating or upper clamping member 31 and thereby retains the closing member 42 against lateral removal thereof from the U-shaped member 20, either inadvertently, or by shaking in transit, or by vibration when wires or cables are clamped therein. The nub 51 and recess 40 therefore provide locking means which prevents lateral removal of the closing member 42 from its normal assembled position over the open end of the U-shaped member so long as the nub 51 is within the recess 40. The locking means operates to prevent lateral removal of the closing member whether or not a cable or cables are clamped within the connector. In other words, it is not essential to clamp a cable within the connector in order to render the locking means effective. Any means is contemplated for preventing lateral displacement of the closing member, the form shown in the drawings being illustrative of such means.

A lock washer 54 is secured to the end of the operating screw 48, as illustrated in Figure 7. The lock washer is received upon an enlarged cylindrical portion 55 so that it is freely rotatable thereupon. The edge of the enlarged cylindrical portion is mashed over at a number of places to form retaining projections 56 thereon which retain the lock washer against removal from the end of the operating screw. The enlarged cylindrical portion 55 fits freely into the larger diameter of the double countersunk recess 40.

In assembling the wire connector, the closing member 42 is removed from the U-shaped member as well as the clamping members 30 and 31. A main cable C has the insulation removed therefrom so that the metallic strands of the cable are exposed. This main cable is slipped down between the arms of the U-shaped member until the wire or cable seats against the bottom of the wire receiving or U-shaped member which forms the clamping seat 21. The central or spacing clamping member 30 is then inserted within the U-shaped member, and its grooved clamping seat 34 engages the cable.

The tap-off cable or wire tc has the insulation removed from the end thereof and is inserted in either the wire seat or groove 35, as illustrated in Figures 3 and 4, or in the wire groove 36, as illustrated in Figures 5 and 6, depending upon whether or not parallel or right angular tap-off is desired. The upper or operating clamping member 31 is then inserted into the U-shaped member so that its wire seat 38 is parallel to and engages the tap-off wire. The wire seat 38 is shown parallel to the seat 35 in Figures 3 and 4 for parallel tap-off, and parallel to the wire seat 36 in Figures 5 and 6 for right angular tap-off.

The closing member 42 is then moved or slid laterally into position over the open end of the frame or U-shaped member 20 with the tongues 22 engaging in the grooves 43. The closing member is slid laterally into position until the shoulders 44 abut against the sides or arms of the U-shaped member. The operating screw 48 is then tightened and the nub 51 enters the recess 40 so that the closing member is now locked against lateral removal from the U-shaped member. Continued tightening of the operating screw presses the clamping members 30 and 31 inwardly so that the main cable is clamped between the wire seats 21 and 34 and the tap-off cable is clamped between the wire seats 35 and 38. The lock washer 54 digs into the surface of the upper clamping member 31 to prevent unloosening of the operating screw from vibration or other causes.

In the second form of the invention illustrated in Figures 8 through 12, the wire connector is so constructed that the closing member is irremovable from the frame or wire receiving member. In this construction provision is made also, as in the form of Figures 1 through 8, for enabling the tap-off wire or cable to be either parallel or at right angles to the main cable.

The wire connector comprises a wire receiving member 60, which is preferably U-shaped, and the bottom of which forms a wire or cable clamping seat 61. The upper or open ends of the U-shaped member extend outwardly and each end carries an inwardly projecting tongue 62. The wire receiving or U-shaped member is wider at the open end thereof so that the ends of the inwardly projecting tongues 62 are approximately in alignment with the inner surfaces 63 of the U-shaped member and hence allow sufficient clearance for passing a cable or cables into the U-shaped member. An opening 64 may be provided in each side of the U-shaped member if it is desired to make provision for the tap-off cable extending at an angle, such as at right angles, to the main cable, as will appear more fully hereinafter.

A central clamping member or wire spacer 66 is movably received in the U-shaped member. It has a wire seat 67 upon one face thereof, a wire seat 68 on the opposite face thereof and parallel to the wire seat 67, and a third wire seat 69 in the same face thereof as the wire seat 68, but extending at an angle and preferably at right angles to the latter wire seat. The central clamping member is longer than the width of the U-shaped member so that outwardly extending wings 70 may be provided thereupon to slidably retain the central clamping member within the U-shaped member. Any means may be provided for retaining the wire spacer or central clamping member within the wire connector.

A closing member 75 has a groove 76 on each side thereof for slidably receiving the inwardly directed tongues 62. The closing member 75 normally is removed from over the open end of the U-shaped member so that the wires or cables may be freely inserted within the U-shaped member, after which the closing member is laterally slid into position closing the opening in the end of the U-shaped member. Any suitable interengaging means carried by the U-shaped member and the closing member, and which are interengageable by lateral relative movement and retain the two parts together, is contemplated. The wire receiving member 60 and the closing member 75 together form a frame.

Means are provided to irremovably retain the closing member upon the frame or U-shaped member. This means is provided because tap-off connections frequently may be made at the top of a pole or high transmission tower and, when the parts are separable, a workman will frequently drop one part in assembling the connector while making a tap-off connection. The second form of construction of wire connector eliminates this difficulty to a certain extent in irremovably retaining the closing member upon the U-shaped member.

The means for retaining the wire receiving or U-shaped member 60 and the closing member 75 together comprises a lug 79, which is carried upon or adjacent one side of the U-shaped member, and a second lug 80 carried upon or adjacent the opposite side of the closing member. Each lug has a hole therethrough, thereby forming an eye to receive one side of a wire loop 81 which is illustrated in Figure 8. The loop is a flat one with two parallel sides and one side passes through the hole in the lug 79, and the other side of the loop passes through the hole in the lug 80. It will be observed that the loop 81 provides a hinge which enables the closing member 75 to be pivotally swung away from adjacent the open end of the U-shaped member, as illustrated in Figure 9, and also permits lateral sliding movement between the closing member 75 and the U-shaped member 60. When the closing member 75 slides laterally into position over the open end of the U-shaped member with the tongue 62 received within the groove 76, the loop 81 slides in both of the lugs 79 and 80 and the loop is long enough so that it permits the closing member 75 to completely cover the open end of the U-shaped member.

An operating means is utilized to clamp the cables within the connector, which operating means is preferably carried by the closing member 75. The operating means includes a screw 84 which is received in a threaded hole 85 provided therefor. The operating screw preferably carries an operating clamping plate or member 86 which is secured to the end of the screw in any suitable fashion. The clamping plate has a curved wire seat 87 which is parallel with the wire seat 68 and has a second wire seat 88 at an angle thereto and preferably at right angles which, when the parts are assembled together, lies in parallel relation with the wire seat 69 upon the central clamping member 66. The operating screw is preferably headless and hence has a hexagonal recess 89 in the top thereof to receive a hexagonal wrench.

The wire connector is put into use or assembled in a manner now to be described. With the wire connector, as illustrated in Figure 9, the central clamping member or wire spacer 66 is removed by lifting it out of the U-shaped member. A main cable C has the insulation removed from a desired point therein so that the metallic cable is entirely exposed. This exposed cable is inserted between the sides of the U-shaped clamping until it rests against the wire seat 61 formed by the bottom of the member. The central clamping member or wire spacer 66 is then inserted so that its clamping seat 67 engages the cable. A tap-off cable tc is then inserted either against the wire seat 68 for parallel tap-off, or against the wire seat 69 for right angular tap-off. The closing member 75 is then hinged about the loop 81 until the grooves 76 are in alignment with the tongues 62, whereupon lateral sliding of the closing member 75 brings this member into position closing the open end of the U-shaped member. The stop formed by the end of the wire loop 81 aids in locating the closing member in proper position completely closing the open end of the U-shaped member.

Upon tightening the operating screw 84, the clamping plate 86 is forced into contact with the tap-off cable tc so that this cable is clamped within the wire connector between the clamping seats 67 and 68, and the main cable C is clamped between the clamping seats 61 and 67. The central clamping member or wire spacer 66, of course, moves under the clamping action so that the pressure of the operating screw is uniform upon both cables. It is evident that where the end of a tap-off cable tc is to be inserted within the wire connector, the closing member 75 may be first laterally slid into position closing the open end of the U-shaped member, after which the end of the tap-off cable may be inserted and the operating screw tightened to clamp both cables within the connector.

This invention is presented to fill a need for improvements in a wire connector. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A wire connector comprising a frame including a U-shaped member, a closing member, tongue and groove means upon the U-shaped member and the closing member to retain the closing member over the open side of the U-shaped member and received thereover by laterally sliding the closing member into position, means retaining the closing member against lateral removal from its normal assembled position, and a wire clamping seat carried by the frame against which a wire is adapted to be clamped; a floating clamping member having a wire seat on opposite sides thereof each of which is adapted to engage a wire; means movably supporting the floating clamping member within the frame; and operating means carried by the frame to clamp one wire between the frame clamping seat and the floating clamping member and a second wire between the operating means and the floating clamping member.

2. A wire connector comprising a frame including a U-shaped member having a wire clamping seat against which a wire is adapted to be clamped and four substantially parallel arms extending therefrom, a closing member, and tongue and groove means upon the ends of the arms and the closing member to retain the latter over the open side of the U-shaped member and received thereover by a laterally sliding movement of the closing member into position; a clamping member having a wire seat on one side thereof which is adapted to engage a wire, the clamping member being substantially the shape of a cross and being retained within the frame by the arms against lateral movement in the direction of the lateral sliding movement of the closing member, the clamping member being movable along the arms; and operating means carried by the frame and extending thereinto to engage the clamping member and clamp one or more wires between the clamping seat on the U-shaped member and the clamping member.

3. A wire connector comprising a frame including a U-shaped member having a wire clamping seat against which a wire is adapted to be clamped and four substantially parallel arms extending therefrom, a closing member, and tongue and groove means upon the ends of the arms and the closing member to retain the latter over the open side of the U-shaped member and received thereover by a laterally sliding movement of the closing member into position; a clamping member having a wire seat which is adapted to engage a wire, the clamping member being in the form of a cross and received between the arms, the clamping member having sides in contact with the arms which permit movement freely towards and away from the wire clamping seat carried by the U-shaped member and prevent substantial cocking of the wire spacer between the arms; and operating means carried by the frame and extending thereinto to clamp one wire between the frame clamping seat and the clamping member and a second wire between the operating means and the clamping member.

4. A wire connector comprising a frame including a U-shaped member, a closing member, tongue and groove means upon the U-shaped member and the closing member to retain the closing member over the open side of the U-shaped member and received thereover by laterally sliding the closing member into position, and a wire clamping seat carried by the frame against which a wire is adapted to be clamped; a floating clamping member having a wire seat on opposite sides thereof each of which is adapted to engage a wire, means movably supporting the floating clamping member within the frame; a second clamping member slidably retained within the frame, a recess in the second clamping member in alignment with an operating means; and operating means carried by the closing member and extending into the frame to clamp one wire between the frame clamping seat and the floating clamping member and a second wire between the second clamping member and the floating clamping member, the end of the operating means engaging within the recess in the second clamping member to retain the closing member against lateral displacement.

5. A wire connector comprising a frame including a U-shaped member having a wire clamping seat against which a wire is adapted to be clamped and four substantially parallel arms extending therefrom, a closing member, and tongue and groove means upon the ends of the arms and the closing member to retain the latter over the open side of the U-shaped member and received thereover by laterally sliding the closing member into position; a clamping member having a wire seat which is adapted to engage a wire, the clamping member being in the form of a cross and received between the arms, the clamping member having sides in contact with the arms which permit movement freely of the clamping member towards and away from the wire clamping seat carried by the U-shaped member and prevent substantial cocking of the clamping member between the arms whereby the clamping member can be removed only from the open end of the U-shaped member, and a recess in the clamping member; and an operating screw carried by the frame and extending thereinto to clamp one wire between the frame clamping seat and the clamping member, the end of the operating screw engaging within the recess in the clamping member to retain the closing member against lateral displacement.

6. A wire connector comprising a frame including a U-shaped member, a closing member, means upon the U-shaped member and the closing member to retain the closing member over the open side of the U-shaped member and received thereover by laterally sliding the closing member into position, and a wire clamping seat carried by the frame against which a wire is adapted to be clamped; means retaining the closing member against separation from the frame including an eye adjacent one side of the frame, an eye adjacent the opposite end of the closing member and spaced from alignment with each other, and a loop having two opposite parallel sides one of which passes through one eye and the other passes through the other eye; and operating means carried by the frame to clamp one or more wires within the frame.

7. A wire connector comprising a frame including a U-shaped member having a wire clamping seat against which a wire is adapted to be clamped and four substantially parallel arms extending therefrom, a closing member, and means upon the ends of the arms and the closing member to retain the latter over the open side of the U-shaped member and received thereover by laterally sliding the closing member into position; a wire spacer having a wire seat on opposite sides thereof each of which is adapted to engage a wire; means for slidably retaining the wire spacer within the frame; and operating means carried by the frame and extending thereinto to clamp one wire between the frame clamping seat and the wire spacer and a second wire between the operating means and the wire spacer.

8. A wire connector comprising a frame including a U-shaped member, a closing member, and means upon the U-shaped member and the closing member to retain the latter over the open side of the U-shaped member and received thereover by laterally sliding the closing member into position; a clamping member movable longitudinally in the U-shaped member and retained thereby against lateral movement, operating means carried by the closing member and extending into the frame to clamp one or more wires therein; and locking means engaging upon actuation of the operating means into the frame to retain the closing member against lateral sliding movement.

9. A wire connector comprising a frame including a U-shaped member, a closing member, and means upon the U-shaped member and the closing member to retain the latter over the open side of the U-shaped member and received thereover by laterally sliding the closing member into position; locking means mounted upon the U-shaped member and movable longitudinally thereupon but retained by the U-shaped member against lateral movement, and means upon the locking means and the closing member which interengage to retain the latter against lateral sliding movement; and operating means carried by the frame to clamp one or more wires within the frame and prevent longitudinal movement of the locking means whereby the closing member is retained in position over the open end of the U-shaped member.

10. A wire connector comprising a frame including a U-shaped member, a closing member, and means upon the U-shaped member and the closing member to retain the latter over the open side of the U-shaped member and received thereover by laterally sliding the closing member into position; locking means mounted within the U-shaped member and movable longitudinally thereupon but retained against lateral movement, means upon the locking means and the closing member which interengage to retain the latter against lateral sliding movement, and a clamping seat upon the locking means to be engaged by a wire or cable; and operating means carried by the frame to clamp one or more wires against the clamping seat whereby the closing member is retained and locked in position over the open end of the U-shaped member.

11. A wire connector comprising a frame including a U-shaped member, a closing member, means upon the U-shaped member and the closing member to retain the closing member over the open side of the U-shaped member and received thereover by laterally sliding the closing member into position, and a wire clamping seat carried by the frame against which a wire is adapted to be clamped; operating means carried by the closing member and extending into the frame to clamp one or more wires therein including a clamping member cooperating with the operating means; and locking means carried by the operating means to retain the closing member against lateral displacement after the operating means has been projected into the frame.

12. A wire connector comprising a frame including a U-shaped member, a closing member, means upon the U-shaped member and the closing member to retain the latter over the open side of the U-shaped member and received thereover by laterally sliding the closing member into position, and a wire clamping seat carried by the frame against which a wire is adapted to be clamped; clamping means slidably retained within the frame; operating means carried by the closing member and extending into the frame to engage the clamping member and clamp one or more wires within the frame; and locking means retaining the closing member against lateral removal over the open end of the U-shaped member including a recess in one of the next two aforesaid means, and a nub on the other means engaging within the recess upon relative longitudinal movement therebetween to retain the closing member against lateral displacement.

STEPHEN N. BUCHANAN.